(12) United States Patent
Grieve

(10) Patent No.: US 8,356,682 B2
(45) Date of Patent: Jan. 22, 2013

(54) FUEL CELL SYSTEM USING EXTERNAL HEAT SOURCES FOR MAINTAINING INTERNAL TEMPERATURE

(75) Inventor: Malcolm James Grieve, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 1256 days.

(21) Appl. No.: 11/645,849

(22) Filed: Dec. 27, 2006

(65) Prior Publication Data

US 2007/0119638 A1    May 31, 2007

Related U.S. Application Data

(63) Continuation-in-part of application No. 11/370,285, filed on Mar. 8, 2006.

(60) Provisional application No. 60/668,166, filed on Apr. 4, 2005.

(51) Int. Cl.
*B60K 1/00* (2006.01)

(52) U.S. Cl. ...................... 180/65.1; 429/433

(58) Field of Classification Search ............. 180/65.1, 180/65.21, 65.225, 5.6, 6.5; 429/400, 433, 429/434

See application file for complete search history.

(56) References Cited

U.S. PATENT DOCUMENTS

| | | | | |
|---|---|---|---|---|
| 5,942,344 A * | 8/1999 | Lehmeier et al. | ............. | 429/434 |
| 6,311,650 B1 * | 11/2001 | Lamm | ............... | 123/3 |
| 6,448,535 B1 * | 9/2002 | Ap | ............. | 219/208 |
| 6,797,421 B2 * | 9/2004 | Assarabowski et al. | ...... | 429/429 |
| 6,860,349 B2 * | 3/2005 | Ogawa et al. | ............. | 180/65.225 |
| 6,871,790 B2 * | 3/2005 | Kaupert et al. | ........... | 237/12.3 B |
| 6,921,596 B2 * | 7/2005 | Kelly et al. | .................... | 429/425 |
| 6,955,861 B2 * | 10/2005 | Yoshizawa et al. | ........... | 429/413 |
| 6,973,982 B2 * | 12/2005 | Yoshikawa et al. | ........... | 429/430 |
| 6,994,930 B1 * | 2/2006 | Geisbrecht et al. | ........... | 429/425 |
| 7,040,430 B2 * | 5/2006 | Nomura et al. | ............. | 180/65.1 |
| 2004/0053087 A1 * | 3/2004 | Akikusa et al. | ................. | 429/20 |
| 2006/0024542 A1 * | 2/2006 | Uozumi et al. | ................. | 429/22 |
| 2006/0219448 A1 | 10/2006 | Grieve et al. | | |

FOREIGN PATENT DOCUMENTS

| | | | |
|---|---|---|---|
| EP | 1060942 A2 | | 4/2000 |
| JP | 2003182379 | * | 7/2003 |
| WO | WO 02/087052 | | 10/2002 |
| WO | WO 02/095853 | | 11/2002 |

* cited by examiner

*Primary Examiner* — J. Allen Shriver, II
*Assistant Examiner* — Bridget Avery
(74) *Attorney, Agent, or Firm* — Thomas N. Twomey

(57) ABSTRACT

A solid oxide fuel cell system including electric resistance elements for heating of space and components within the "hot zone" enclosure of the system, preferably in combination with means for using "waste" heat from other sources, to assist in warm-up from a cold start and/or to maintain a stand-by temperature of reformer and fuel cell elements within the system and/or to maintain optimum operating temperatures within the system during periods of very low electrical demand on the system. A method is included for using off-peak grid electricity, battery-stored onboard electricity, or vehicle-generated electricity to energize the resistance heaters, as well as utilizing gaseous waste heat sources such as vehicle exhaust gas to complement the resistance heating.

21 Claims, 2 Drawing Sheets

FUEL CELL SYSTEM USING EXTERNAL HEAT SOURCES FOR MAINTAINING INTERNAL TEMPERATURE

RELATIONSHIP TO OTHER APPLICATIONS AND PATENTS

The present application is a Continuation-In-Part of pending U.S. patent application Ser. No. 11/370,285, filed Mar. 8, 2006, which claims the benefit of Provisional Application Ser. No. 60/668,166, filed Apr. 4, 2005.

TECHNICAL FIELD

The present invention relates to solid oxide fuel cell (SOFC) systems; more particularly, to means for providing heat to the stacks and/or reformer of a solid oxide fuel cell system; and most particularly, to a solid oxide fuel cell system having resistive electric heating elements disposed therein for warming up and/or maintaining the temperatures of components of the system.

BACKGROUND OF THE INVENTION

A typical prior art solid oxide fuel cell system is fueled by a hydrogen-containing reformate fuel derived from catalytic reforming of either liquid or gaseous hydrocarbons such as gasoline or methane. Thus, such a fuel cell system must have a source of supply, which may be onboard storage, of a hydrocarbon fuel. Solid oxide fuel cell stacks and reformers operate at temperatures elevated well above ambient, for example, in the range between about 550° C. and about 850° C., or even higher.

Fuel cell systems are used, or contemplated for use, as auxiliary power units (APUs) for providing electric power in, for example, vehicles wherein motive power is derived from another, primary source such as an internal combustion engine. Such systems are also contemplated as stand-alone electric generators, which may define combined heat and power (CHP) systems. For discussion purposes herein, all such contemplated uses of fuel cell systems are referred to as APUs.

A first recognized problem in operation of prior art fuel cell systems is the time required to change over from a non-productive cold start mode to an operating mode productive of electricity. It is known to form and ignite a combustible hydrocarbon mixture and to pass the hot combustion gases through the reformer and the fuel cell stack to bring those components up to operating temperature in from about 20 minutes to up to several hours. Drawbacks of this procedure are that it is wasteful of fuel, and it creates undesirably large thermal stresses on elements of the reformer and stack which can damage or destroy parts of the system.

A second recognized problem is how to maintain a prior art fuel cell system at a standby readiness condition (that is, at near-operating temperature) such that the system may be changed over to operating mode in a very short period of time. It is known to highly insulate the reformer and stack to minimize heat loss during standby mode and to continue periodic combustion of small amounts of hydrocarbon fuel to keep the reformer and stack warm on standby. Again, this procedure is wasteful of fuel.

The start-up and standby losses can be mitigated in large utility or industrial systems by using the system in more of a base-load where there is almost always sufficient electrical power generated for the system to be thermally self-sustaining, or by adding additional or premium insulation. In small scale systems, however, a self-sustaining usage profile may not be economic when compared to purchasing lower cost grid electricity most of the time, and additional or premium insulation may not be acceptable in terms of packaging (size of the unit) and cost.

If by-product thermal energy is needed, such as to keep a vehicle warm when parked in winter conditions, or to heat or provide hot water for a building, then the combustion of a continuous or periodic quantity of fuel inside the SOFC system can serve to regulate the temperature of the stack, reformer catalyst, and other "hot zone" components to a partially or fully warmed up condition and to supply hot exhaust for the external thermal load. However, where "waste" heat is not needed, or where heating can be performed at lower cost or with less generation of greenhouse gases, it would be preferable not to burn fuel in the SOFC to keep the system at stand-by. For example, off-peak electricity supplied by renewable, nuclear, or high efficiency power plants, coupled with an electrically powered heat pump system may be more efficient for space heating in a building than keeping the SOFC hot for long periods of time for its thermal by-product only.

What is needed in the art is an alternative method and apparatus for warming up or maintaining an SOFC hot zone at a stand-by temperature consuming little or no hydrocarbon fuel specifically for such heating.

It is a principal object of the present invention to warm up or maintain an SOFC hot zone at a stand-by temperature without consuming hydrocarbon fuel within the SOFC.

SUMMARY OF THE INVENTION

Briefly described, a solid oxide fuel cell system is provided with means for electric resistance heating of space and elements within the "hot zone" enclosure of the system, preferably in combination with means for using "waste" heat from other sources, to assist in warm-up from a cold start and/or to maintain a stand-by temperature of reformer and fuel cell elements within the system and/or to maintain optimum operating temperatures within the system during periods of very low electrical and thermal demand on the system. A method is included for using off-peak grid electricity, battery-stored onboard electricity, or vehicle-generated electricity to drive the resistance heaters, as well as utilizing waste heat sources such as vehicle exhaust gas to complement the resistance heating.

BRIEF DESCRIPTION OF THE DRAWINGS

The present invention will now be described, by way of example, with reference to the accompanying drawing, in which.

DESCRIPTION OF THE PREFERRED EMBODIMENTS

The present invention is directed to methods and apparatus for electric resistance heating of space and elements within the "hot zone" enclosure of a solid oxide fuel cell system, preferably in combination with means for using "waste" heat from other sources, to assist in warm-up from a cold start and/or to maintain a stand-by temperature of reformer and fuel cell elements within the system and/or to maintain optimum operating temperatures within the system during periods of very low electrical and thermal demand on the system.

Figure 1:
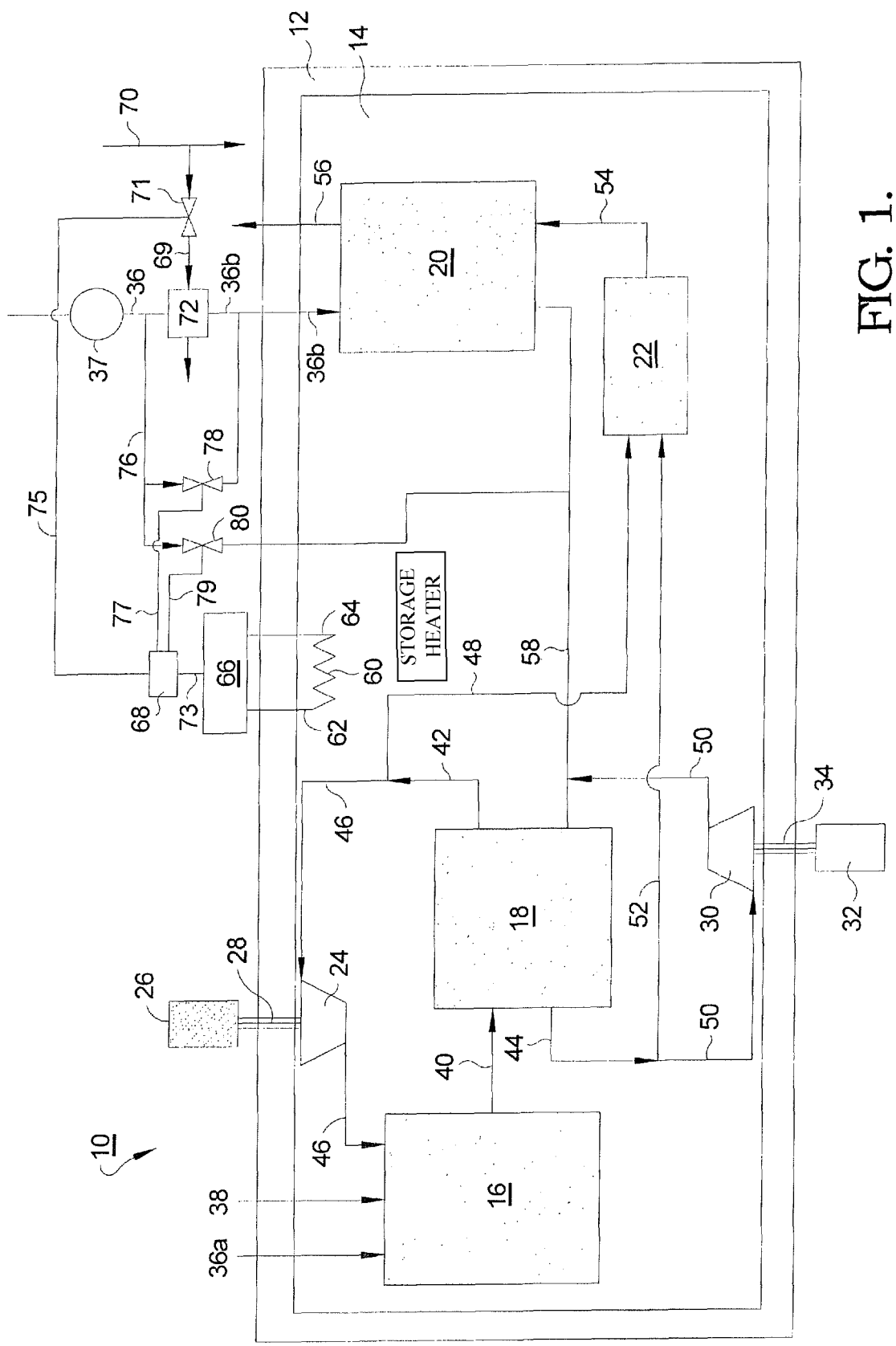
FIG. 1 is a schematic drawing of a fuel cell APU (auxiliary power unit) in accordance with the invention.

Referring to FIG. 1, a solid oxide fuel cell system 10 in accordance with the invention comprises an insulated enclosure 12 defining therewithin a heated space 14, known colloquially in the art as "the hot zone". A catalytic hydrocarbon fuel reformer 16, SOFC stack 18, cathode air heat exchanger 20, and anode tailgas combustor 22 are disposed within enclosure 12 for operation at elevated temperatures as is well known in the SOFC prior art. Further, an anode tailgas blower 24 is disposed in the hot zone for recycling a portion of the anode tailgas from the stack, as described below. Anode tailgas blower 24 is driven by an electric motor 26 that preferably is disposed outside the hot zone and is connected to the blower via a shaft 28 extending through the wall of enclosure 12. An optional cathode tailgas recycle blower 30 may be disposed in the hot zone for recycling a portion of the hot cathode tailgas from the stack, as described below. Cathode tailgas blower 30 is driven by an electric motor 32 that preferably is disposed outside the hot zone and is connected to the blower via a shaft 34 extending through the wall of enclosure 12.

In operation, hydrocarbon fuel 38 and reforming air 36a are fed to fuel reformer 16 which generates reformate fuel 40 for stack 18. This reformer air 36a may be partially preheated by a heat exchanger (not shown). Stack 18 produces electricity and emits a hot stream of anode tailgas 42 and a hot stream of cathode tailgas 44. A first portion 46 of anode tailgas 42 is recycled via blower 24 into reformer 16. The remaining portion 48 of anode tailgas 42 is sent to combustor 22. Optionally, a first portion 50 of cathode tailgas 44 may be recycled via blower 30 into the air inlet of stack 18. The remaining portion 52 of cathode tailgas 44 is sent to combustor 22. Portions 48,52 are mixed and burned in combustor 22 to produce a hot combustor exhaust 54 which is passed through a first side of cathode air heat exchanger 20 and then discharged to atmosphere 56. Incoming cathode air 36b is passed through a second side of cathode air heat exchanger 20 to provide heated incoming cathode air 58 to stack 18.

The apparatus and operation as described thus far are well known in the prior art.

Still referring to FIG. 1, an electrically resistive heating element 60 is disposed within heated space 14 and is connected via leads 62,64 extending through the wall of enclosure 12 to an external, controlled source of electric power 66. Electric power source 66 may be, for example, a battery, an electric grid, a generator or a second power system, such as another fuel cell. When power source 66 is energized, as at the direction of an external controller 68, heating element 60 radiates heat into space 14 thereby heating system components 16,18,20,22. Obviously, a plurality of heating elements 60 may be disposed at a plurality of locations within enclosure 12 as may be needed to evenly heat the various components. For example, elements 60 may be placed in the hot zone to radiate heat into stack 18 in a pattern to heat the sides or ends of the stack which would otherwise be slower to heat up because of the gas flow geometry in which hot air and hot reformate normally flow through and warm up the system.

Still referring to FIG. 1, a means for providing "waste heat" to further assist in heating system components 16, 18, 20 and 22 is shown. Heated gas 69, diverted from, for example, exhaust 70 from an internal combustion engine, a gas turbine engine, a stationary heating plant, a space heater, a fuel cell, or the like, may be controllably fed by valve 71 to the hot side of auxiliary cathode air heat exchanger 72 to selectively heat cool, incoming air 36, at a point downstream of blower 37. For example, if heated space 14 is determined to be below a desirable temperature for operation, controller 68 can send a first signal 73 to energize heating element 60, as described above, and second signal 75 to valve 71 to divert a measured amount of hot gas through heat exchanger 72 to provide a combined amount of thermal energy to effectively heat components 16, 18, 20 and 22. Optionally, a portion 76 of cool, incoming air 36 may be selectively diverted around either or both of heat exchangers 20, 72 to modulate the temperature of the air entering the stack 18. Third and fourth signals 77 and 79 sent by controller 68 to valves 78 and 80, respectively, divert measured amounts of cool air needed to control the temperature of the air entering the cathode side of stack 18.

All sources of "waste" heat, that is heat which is not put to other uses but is typically simply discharged to the atmosphere or requires active cooling, whether listed herein or not, may be used to assist in heating components 16, 18, 20 and 22 and are to be considered as being within the scope of the invention. Such waste heat can effectively provide heat to the components within enclosure 12 and thus reduce the operating time and/or electrical power level of heating element 60 or the need to perform supplementary hydrocarbon fuel combustion as described above.

In a typical method or strategy for using waste heat in accordance with the invention, at cold start-up of an SOFC, waste heat from a waste heat source, such as the exhaust gas of an internal combustion engine of a vehicle on which the APU is mounted, is passed through the auxiliary cathode air heat exchanger 72 to initiate warm-up of incoming air 36. The electric resistor 60 preferably is also energized at this time, particularly late in the warm-up when the temperature of the APU may need to be supplemented beyond what the heated gas can deliver. When the APU is at a desired temperature or is being heated at a desired rate (defined for example by a temperature gradient across the stack), valve 78 (and/or valve 80) diverts the heated gas around the auxiliary cathode air heat exchanger 72. Heating of the APU may be continued via the heating element alone, which may be energized by the vehicle generator on the internal combustion engine (for example during regenerative braking as described below).

Figure 2:
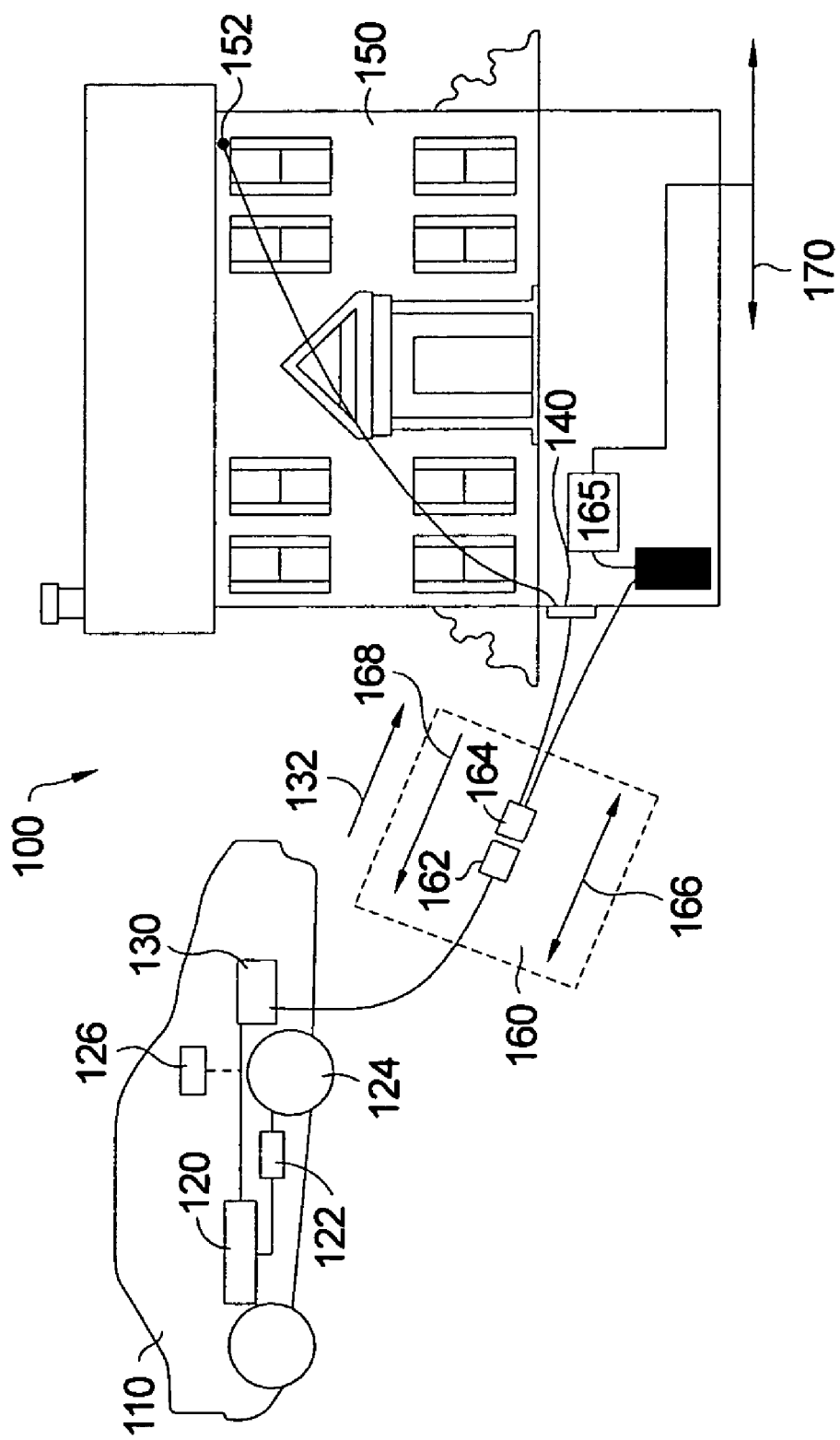
FIG. 2 is a schematic drawing showing an exemplary electric vehicle including the APU shown in FIG. 1 connected to an electric power grid, a source of hydrocarbon fuel, and a stationary heat sink such as a building.

Referring to FIG. 2, an exemplary usage 100 of electricity for operating element 60 to heat space 14 (not shown but contained in the APU 130) includes a hybrid electric vehicle 110 and stationary structure 150, for example, a residence, office, shopping center, truck stop, parking lot docking station, or other structure, electrically connected to a regional grid 152, substantially as shown in the parent application referenced above. Vehicle 110 includes a rechargeable electrical energy source 120, for example, one or more low-impedance batteries such as nickel metal hydride or lithium ion batteries, as its primary source of energy for powering an electric machine 122, such as, for example, a motor/generator, connected to wheel 124 for vehicle propulsion. Rechargeable electrical energy source 120 may be recharged by being plugged into an outlet 140 of structure 150 connected to regional grid 152 when the vehicle is stationary or by APU 130 for recharging the batteries 120 when vehicle 110 is underway. APU 130 preferably is substantially identical to APU system 10 shown in FIG. 1 and described above. By recharging the batteries during vehicle use, APU 130 extends the driving range of the vehicle and may also be used, in part, to propel the vehicle in parallel with batteries 120 in order to extend peak power. Optionally, internal combustion engine 126 may be provided to supplement electrical machine 122 in providing propulsion power to wheel 124, or as a primary source of propulsion power.

Fuel to operate an SOFC APU when the vehicle is in motion is derived from hydrocarbon fuel (not shown) stored on the vehicle, such as gasoline, diesel fuel or ethanol, after being reformed into hydrogen through the use of an onboard reformer as is well known in the fuel cell arts and shown in FIG. 1. The electrical energy produced by the APU is used to power electric accessories and recharge batteries 120 when vehicle 110 is moving. A SOFC APU also produces high grade waste heat 132 in addition to the power for recharging the batteries.

Stationary structure 150 also includes docking station 160 for conveniently connecting vehicle 110 to regional grid 152 for the purposes which will now be described.

Docking station 160 includes vehicle connector 162 for being matingly connected to station connector 164. Connectors 162,164 include bi-directional electrical connection 166 for permitting electrical power to be selectively received from grid 152 by batteries 120 or heating elements 60 in APU 130, or to be selectively delivered to grid 152 from batteries 120 and/or APU 130 when the connection is made, via outlet 140. Thus, during periods when the regional grid is short on power, additional power may be supplied to the grid from APU 130 in connected vehicle 110 and other similarly connected vehicles at other docking stations (not shown). Power may also be received by the docked vehicle from the grid to recharge the batteries, to operate heating elements 60 within the APU, or to be used by the vehicle 110 for electrical accessories (not shown).

In APU discharge mode, power passing from APU 130 to grid 152 may pass either through or around batteries 120. In battery charge mode, power passing from grid 152 to batteries 120 may pass either through or around APU 130. In APU heating mode, power passing from grid 152 may pass either through or around batteries 120.

It will be obvious to those of skill in the art that electric power passing between vehicle 110 and grid 152 must be conditioned in known fashion through bi-directional electrical connection 166 to provide electrical compatibility, as vehicle 110 and batteries 120 typically operate on direct current whereas grid 152 utilizes alternating current.

Preferably, system 100 further includes a controller 165 which, in conjunction with communications network 170, controls receipt and delivery of the electrical power from the connected vehicles by the regional grid to optimize the efficiency of system 100. For example, network 170 can receive a combination of internet, global position system, or wireless technology to monitor and communicate vehicle and structure status (SOFC temperature, vehicle charging current, the electric and thermal loads of the stationary structure, the batteries' state of charge, anticipated user needs of the vehicle) and network commands (requested power, grid synchronization and connection state) to control the operation of system 100. When required, the network/controller is capable of starting up SOFCs at selected locations from a cold state. In a situation where the SOFC is inherently hot from a recently completed drive cycle, the network/controller 165/170 can interrogate the state of each of a plurality of vehicles 110 upon docking of each vehicle and can selectively and preferentially use only those connected SOFCs which are already at operating temperature, thereby avoiding the need to consume energy in starting up cold SOFCs except in the most severe grid peaks. Further, the network can select which SOFCs are needed to be kept at hot stand-by based on current and predicted grid power needs and the current and predicted number, location and state of the plugged in vehicles/SOFCs. Alternatively the grid can supply electrical energy to heat or keep hot any of the plurality of SOFCs, thus avoiding the need to consume a fossil fuel for this function. In cases where the grid electricity is very inexpensive, such as at night or during days of the week or times of the year when grid electricity is in surplus, the system is programmable to partially or fully substitute grid electricity as the power source for maintaining SOFC temperature. Alternatively, electricity for maintaining internal temperature of a first SOFC is an array of SOFCs may be derived from the electric output of one or more other SOFCs in the array. (If the stacks require it, a tiny amount of fuel may be reformed to generate a reducing gas to protect the stack anodes from reoxidation.) Thus, the network/controller need keep only as many SOFCs at hot stand-by as are necessary to meet the anticipated peak load and can select the method of keeping these SOFCs hot, based on economics and system needs.

Since the exhaust of an SOFC is clean and at a relatively high temperature (300-500° C.), waste heat 132 exhausted from the SOFC of a docked vehicle can be ducted over a heat exchanger (not shown) to provide useful heat to the stationary structure. This heat recovery may be effected during operation, stand-by, or shutdown of the APU. Network/controller 165/170 can be called upon to optimally match the electrical needs of grid 152 with the thermal needs of stationary structure 150. If additional electrical power from the SOFCs is needed by the grid, certain SOFCs can be selectively turned on and their power output to the grid managed to minimize cost and emissions from the SOFCs by operating at their optimal points to meet the electric demands of the grid and thermal demands of the stationary structure. Conversely, at times when the electric demands placed on the regional grid are low, SOFCs can be selectively shut-off and the thermal needs of those stationary structures can be supplied electrically from the grid to power heat pumps, resistive heating units, etc; or, if the owner chooses, the thermal needs of the stationary structure can be supplied entirely by the SOFC.

Docking station 160, through connectors 162,164 or through a separate connector, may be also be provided with a one-directional fuel connection 168. When vehicle 110 is docked to stationary structure 150, fuel connection 168 allows the use by the SOFC of fuel available at stationary structure 150, for example, natural gas or propane, and allows for the hydrocarbon fuel already stored in the vehicle to remain in the tank for future over-the-road use. In instances where the SOFC of a docked vehicle is run on the hydrocarbon fuel stored in the tank, controller 165 may be used to monitor the level of tank fuel and to prevent the tank fuel from dropping below a desired level by switching the SOFC fuel to a stationary structure's piped-in or storage fuel supply.

While the invention described includes the use of a controller 165 that would optimize the needs and efficiencies of the regional grid 152, it is understood that the controller could similarly be used to optimize the needs of the particular stationary structure 150. For example, the controller could allow for the prioritization of SOFC electrical output when such output is a more economical source than from the grid or for the prioritization of the use of the SOFC's waste heat in place of the use of heating units powered by the regional grid.

Note that for a stationary SOFC system used for a CHP application, as would be typical for most residential and commercial SOFC applications and some larger scale systems, the addition of electric heating in accordance with the invention is analogous to the "storage heater" which is used widely in the United Kingdom to store thermal energy in ceramic bricks in an insulated housing, using night-time off-peak electricity. If the temperature of the SOFC hot zone is allowed to swing between its normal stand-by temperature and it peak operating temperature (for example, 550° C. and 850° C., respectively), a large amount of thermal energy can be stored in the stack at night and released in the morning peak with little or no fuel consumed. If, as may occasionally happen, the surplus electricity is not available from the grid, fuel energy can be readily substituted to keep the stack hot and available to support the grid electrically, and to supply by-product heat from the SOFC or additional fuel-fired heating as may be required to the CHP system.

In addition to the vehicle examples discussed above, and applicable to all vehicle applications, electricity sometimes is available onboard a vehicle at very low (essentially zero) marginal cost. For example, in a gas/electric hybrid vehicle when the battery is fully charged or if the braking power exceeds the regenerative rate capability of the battery, then electrical energy will be wasted, in the sense that additional friction-based braking is used and not recovered. As a resistive heating element 60 requires no sophisticated control of voltage and current, a high power generator and simple power electronics can be used to pass through to the SOFC resistors the power not used for battery charging. In an emission test drive cycle such as the US06 schedule with frequent severe acceleration and deceleration modes, substantial power for maintaining the SOFC temperature is then available. Even in a conventional (non-hybrid) vehicle, up to a few kilowatts may be available from a conventional engine-driven generator in coasting or engine braking modes. To the extent that this is surplus to what the battery can absorb, this electrical energy can be used to assist in the warm-up or maintenance of SOFC temperature without consumption of hydrocarbon fuel specifically for that purpose; hence, the energy is "free".

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system having an enclosure containing components having an operating temperature sufficiently high to produce electricity, said fuel cell system comprising:
    at least one electrical resistance heating element disposed within said enclosure for heating said components to a temperature near said operating temperature; and
    a storage heater for storing thermal energy generated by said electrical resistance heating element when surplus electricity is available;
    wherein said storage heater is disposed within said enclosure.

2. A fuel cell system in accordance with claim 1 comprising a plurality of said electrical resistance heating elements.

3. A fuel cell system in accordance with claim 1 wherein said electrical resistance heating element is energized by electricity from a source outside of said fuel cell system.

4. A fuel cell system in accordance with claim 1 further comprising a heat exchanger disposed outside said enclosure, wherein one of said components within said enclosure includes a fuel cell stack having at least one cathode and at least one anode, and wherein a hot side of said heat exchanger receives hot gas from a source outside of said fuel cell system to heat incoming air to said at least one cathode.

5. A fuel cell system in accordance with claim 1 wherein said operating temperature is above 550° C.

6. A fuel cell system in accordance with claim 3 wherein said outside source is selected from the group consisting of a battery, an electric grid, an automotive generator, and a second power system.

7. A fuel cell system in accordance with claim 4 wherein said hot gas is selected from the group consisting of exhaust gas from an internal combustion engine, exhaust gas from a gas turbine engine, exhaust gas from a fuel cell power unit and exhaust gas from a space heater.

8. A fuel cell system in accordance with claim 5 wherein said fuel cell system is a solid oxide fuel cell system.

9. A fuel cell system having an enclosure containing components having an operating temperature sufficiently high to produce electricity, said fuel cell system comprising a heat exchanger disposed outside said enclosure for heating said components to a temperature near said operating temperature, wherein one of said components within said enclosure includes a fuel cell stack having at least one cathode and at least one anode, and wherein a hot side of said heat exchanger receives hot gas from a source outside of said fuel cell system to heat incoming air to said at least one cathode.

10. A fuel cell system in accordance with claim 9 wherein said hot gas is selected from the group consisting of exhaust gas from an internal combustion engine, exhaust gas from a gas turbine engine, exhaust gas from a fuel cell power unit and exhaust gas from a space heater.

11. A fuel cell system in accordance with claim 9 wherein said operating temperature is above 550° C.

12. A fuel cell system in accordance with claim 9 wherein said fuel cell system requires a fueling rate sufficiently high to produce electricity and said heat exchanger heats said components to a temperature near said operating temperature when said fueling rate is not sufficiently high to produce electricity.

13. A fuel cell system in accordance with claim 11 wherein said fuel cell system is a solid oxide fuel cell system.

14. A fuel cell system having an enclosure containing components having an operating temperature sufficiently high to produce electricity, said fuel cell system comprising:
    at least one electrical resistance heating element disposed within said enclosure for heating said components to a temperature near said operating temperature; and
    a storage heater for storing thermal energy generated by said electrical resistance heating element when surplus electricity is available;
    wherein said fuel cell system requires a fueling rate sufficiently high to produce electricity and said electrical resistance heating element heats said components to a temperature near said operating temperature when said fueling rate is not sufficiently high to produce electricity.

15. A fuel cell system in accordance with claim 14 wherein said electrical resistance heating element is energized by electricity from a source outside of said fuel cell system.

16. A fuel cell system in accordance with claim 14 further comprising a heat exchanger disposed outside said enclosure, wherein one of said components within said enclosure includes a fuel cell stack having at least one cathode and at least one anode, and wherein a hot side of said heat exchanger receives hot gas from a source outside of said fuel cell system to heat incoming air to said at least one cathode.

17. A fuel cell system in accordance with claim 16 wherein said hot gas is selected from the group consisting of exhaust gas from an internal combustion engine, exhaust gas from a gas turbine engine, exhaust gas from a fuel cell power unit and exhaust gas from a space heater.

18. A fuel cell system having an enclosure containing components having an operating temperature sufficiently high to produce electricity, said fuel cell system comprising:
    at least one electrical resistance heating element disposed within said enclosure for heating said components to a temperature near said operating temperature; and a storage heater for storing thermal energy generated by said electrical resistance heating element when surplus electricity is available;

wherein said storage heater is in thermal communication with said components for heating said components to a temperature near said operating temperature.

19. A fuel cell system in accordance with claim 18 wherein said electrical resistance heating element is energized by electricity from a source outside of said fuel cell system.

20. A fuel cell system in accordance with claim 18 further comprising a heat exchanger disposed outside said enclosure, wherein one of said components within said enclosure includes a fuel cell stack having at least one cathode and at least one anode, and wherein a hot side of said heat exchanger receives hot gas from a source outside of said fuel cell system to heat incoming air to said at least one cathode.

21. A fuel cell system in accordance with claim 20 wherein said hot gas is selected from the group consisting of exhaust gas from an internal combustion engine, exhaust gas from a gas turbine engine, exhaust gas from a fuel cell power unit and exhaust gas from a space heater.

* * * * *